Figure 1:
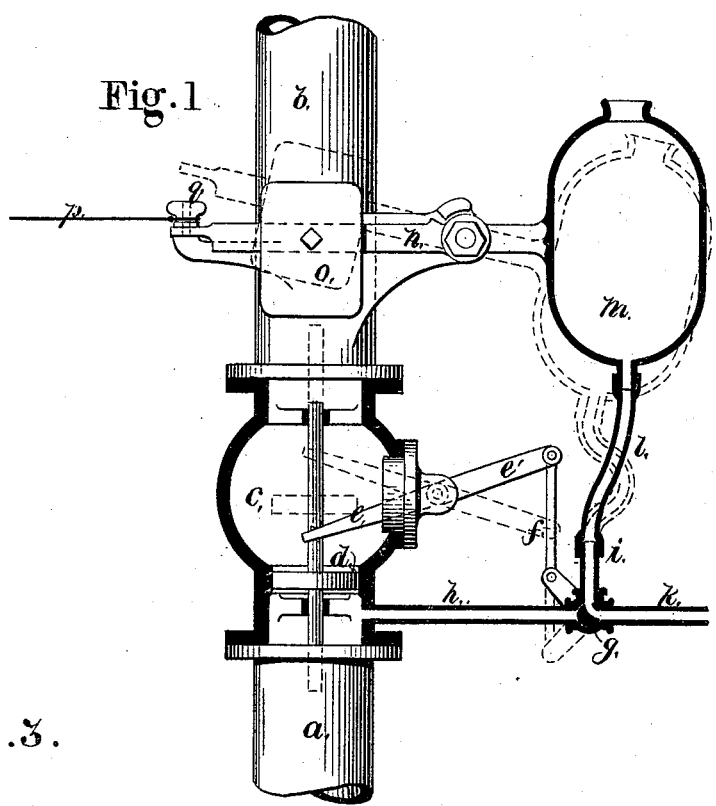

(Model.)

J. C. MELOON.
AUTOMATIC FIRE EXTINGUISHER.

No. 250,935. Patented Dec. 13, 1881.

WITNESSES:
J. A. Miller Jr
Wm. L. Coey

INVENTOR:
Jonathan C. Meloon
by Joseph A. Miller atty ated December 13, 1881.
UNITED STATES PATENT OFFICE.

JONATHAN C. MELOON, OF PROVIDENCE, RHODE ISLAND, ASSIGNOR TO THE PROVIDENCE STEAM AND GAS PIPE COMPANY, OF SAME PLACE.

AUTOMATIC FIRE-EXTINGUISHER.

SPECIFICATION forming part of Letters Patent No. 250,935, dated December 13, 1881.

Application filed March 9, 1881. (Model.)

*To all whom it may concern:*

Be it known that I, JONATHAN C. MELOON, of the city and county of Providence, and State of Rhode Island, have invented a new and useful Improvement in Automatic Fire-Extinguishers; and I hereby declare that the following is a full, clear, and exact description of the same, reference being had to the accompanying drawings, forming part of this specification.

This invention has reference to an improvement in means for operating an alarm in connection with a system of automatic fire-extinguishers.

The invention consists in the peculiar and novel arrangement by which the flow of water to the device operating the alarm is controlled by a cock or valve, so as to prevent false alarms, as also in the peculiar device for operating the alarm, as will be more fully set forth hereinafter.

In automatic fire-extinguishers in which a system of pipes distributed over a building is provided with distributers which are opened by the action of heat, and in which the system is connected with the water-mains, the drawing of water for other purposes from any part of the main produces such variations in the pressure that any alarm operated by a change in the pressure will at times be operated when there exists no cause for such an alarm.

To make the operation of such an alarm more reliable and not subject to intermittent change in pressure, or to the action and reaction of what is known as the "water-hammer," is the object of this invention.

Figure 3:
Figure 2:
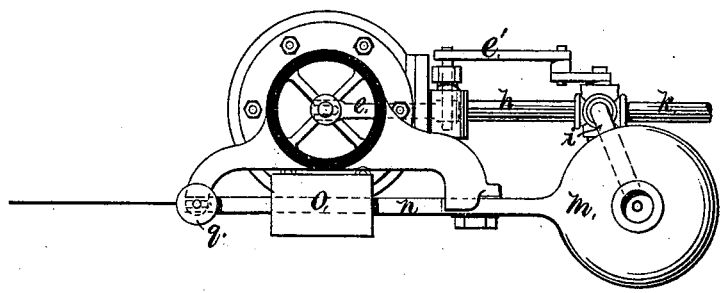

Figure 1 is a view, partly in section, of a device for releasing an alarm or otherwise operating the same. Fig. 2 is an end view of the device, and Fig. 3 represents a three-way cock for controlling the flow of the water to and from the device operating the alarm.

In the drawings, $a$ is the supply-pipe, connected with a reservoir of water or with the city water-supply.

$b$ is the main connecting with the system for distributing the water to the automatic fire-extinguishers.

$c$ is the valve-case, and $d$ the valve regulating the water-supply.

$e$ is an arm connected with the valve-stem and a rocking shaft journaled in a stuffing-box.

$e'$ is an arm connected with the same rocking shaft on the outside of the valve-case, so that every motion of the valve $d$ is transmitted by the arm $e$, the end of which is connected with any suitable valve or cock by the rod $f$, and in this case is connected with the three-way cock $g$.

$h$ is a pipe leading from the main or valve-case to the three-way cock.

$i$ is a pipe leading from the three-way cock to the alarm-operating device, and $k$ is a discharge-pipe.

$l$ is a flexible pipe leading to the chamber or vessel $m$, supported on the hinged arm $n$, on which the weight is counterbalanced by the adjustable weight $o$.

$p$ is a wire or cord, secured to the detachable button $q$, which is held on a pin.

The operation of the device is as follows: If the vessel or chamber $m$ is so counterbalanced by the weight $o$ that the vessel must be filled half-full of water before the weight can be raised by the vessel $m$, the button $q$ will not be detached until that quantity of water has been admitted to the vessel, when the vessel in sinking will raise the end of the arm $n$ and push the button $q$ off the pin, releasing the alarm, breaking the circuit, or otherwise causing an alarm to be sounded. If, now, from any cause, the valve $d$ is suddenly moved from its seat, the motion will be transmitted to the cock or valve $g$, which, being provided with proper ports, will open a communication between the main and the vessel $m$, and water will flow into the vessel. If the valve is open for only a short time, and is closed before the necessary quantity of water has been supplied to the vessel $m$, no alarm will be given, and as the return of the valve will open the connection from the vessel $m$ to the discharge-pipe $k$, as shown in Fig. 1, the water will flow from the vessel $m$. When, now, one or more of the automatic fire-extinguishers are opened so as to discharge water continuously, then the water will continue to flow into the vessel $m$. The weight of the water will overbalance the weight $o$, raise the same, and discharge the wire $p$ by pushing the button $q$ off the pins, or otherwise release the alarm.

In place of the counterbalanced vessel $m$, a diaphragm may be placed over a stationary vessel and the same connections made, so that at each sudden rising of the valve water will be admitted to the vessel, and on the reseating of the valve discharged, as is done in the device shown in Fig. 1, and when the valve continues open the vessel will be filled and the diaphragm, operated upon by the full pressure of the water in the main, will raise a pin, operate one arm of a lever, or otherwise act to operate any suitable alarm.

If the wire $p$ is connected with the lever controlling the valve of a steam-whistle, the whistle will sound the alarm as soon as the button $q$ is released, and, if connected to a suspended weight, the sudden release of the button $q$ will allow the weight to fall, and the falling weight can be made to operate an alarm.

I do not wish to confine myself to the devices shown for controlling the flow of water to the chamber $m$, or from the same, as it is obvious that other well-known devices may be used in their stead by which water is admitted and discharged at each fluctuation of the valve or allowed to flow when the supply-valve is permanently open, in which case only an alarm is to be given.

Having thus described my invention, I claim as new and desire to secure by Letters Patent—

1. The combination, with the valve controlling the water-supply to a system of automatic fire-extinguishers and a vessel connected with the water-supply and arranged to operate an alarm when the necessary quantity of water is supplied thereto, of a cock or valve operated by the main valve to control the water-supply to said vessel, as and for the purpose set forth.

2. The combination, with the vessel $m$ and pipes $h$, $i$, and $k$, of the valve $d$ and cock $g$, and means for communicating the motion of the valve to the cock, all constructed to control the flow of water to the vessel, as described.

3. The combination, with the wire $p$, button $q$, and counterbalanced vessel $m$, of the valve $d$, cock $g$, arm $e$, rod $f$, and pipes $h$, $i$, and $k$, constructed to regulate the flow of water to the vessel $m$, so as to operate the alarm only when the extinguishers are open, as described.

JONATHAN C. MELOON.

Witnesses:
JOSEPH A. MILLER,
JOSEPH A. MILLER, Jr.